Patented Apr. 17, 1928.

1,666,143

UNITED STATES PATENT OFFICE.

TILLIE MILLER, OF CHEYENNE, WYOMING.

COMPOSITION OF MATTER FOR USE IN EDGING FABRICS.

No Drawing.  Application filed May 26, 1927. Serial No. 194,534.

This invention relates to a composition of matter for use in edging fabrics so as to prevent them from fraying or ravelling, one of the objects being to provide a composition which can be applied readily and which, when in position, will not detract from the the appearance of the fabrics.

A further object is to provide a preparation which is especially useful with fine silk and similar material which easily frays.

A further object is to provide an improved method whereby the composition of matter can be applied to the edges of fabrics in such a way as to dry quickly so as to permit rapid production of the finished fabrics.

With the foregoing and other objects in view which will appear as the description proceeds the invention consists of certain novel steps in the method hereinafter pointed out and claimed and also in the following ingredients substantially in the proportions stated, to wit

|  | Parts. |
|---|---|
| Orange shellac | 15 |
| Rosin | 5 |
| Stearic acid | 5½ |
| Dry aluminum, bronze or gold paint | 5½ |

In preparing the composition the several ingredients mentioned are thoroughly mixed and are heated to a boiling temperature. The composition is maintained at this temperature in a suitable container and while thus heated is ready for use. The edges of the fabrics to be treated are dipped into the hot composition and, when withdrawn therefrom, will dry almost immediately, thereby leaving a minute ridge or border of the composition along the edge of the fabric. This border constitutes a binder for holding the fibers together so as to prevent fraying. Furthermore the border constitutes an attractive margin or finish for the fabric, is permanent and flexible.

What is claimed is:

The herein described composition of matter for use in edging fabrics, which consists of the following ingredients substantially in the proportions stated, to wit, shellac 15 parts; rosin 5 parts; stearic acid 5½ parts; and a metallic powder 5½ parts.

In testimony that I claim the foregoing as my own, I have hereto affixed my signature.

TILLIE MILLER.